Jan. 26, 1954
W. C. MENNEAR
2,667,047
REAR AXLE FOR VEHICLES
Filed March 6, 1950
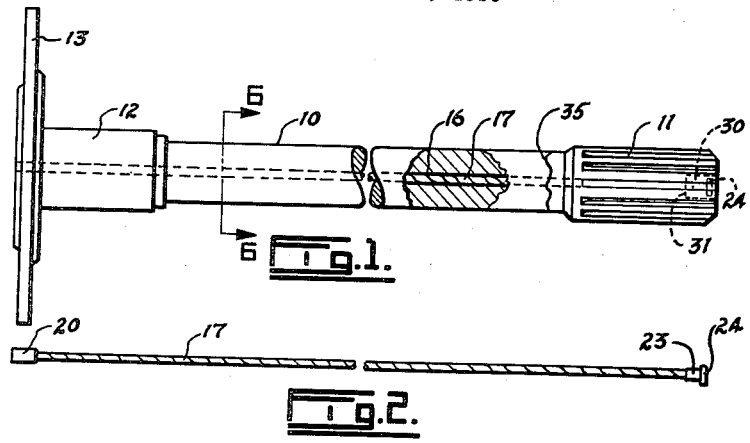
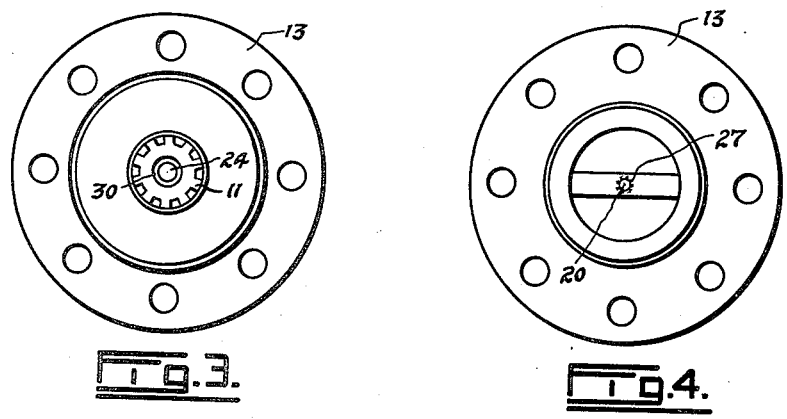
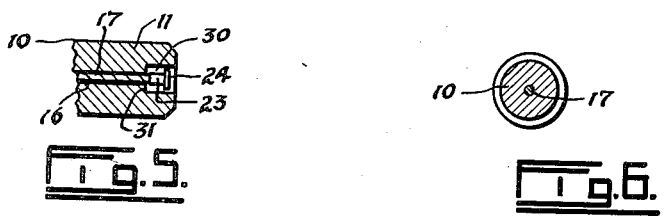
INVENTOR
WILLIAM CHARLES MENNEAR
BY
Fetherstonhaugh & Co.
ATTORNEYS Patented Jan. 26, 1954

2,667,047

UNITED STATES PATENT OFFICE 2,667,047

REAR AXLE FOR VEHICLES

William Charles Mennear, New Westminster, British Columbia, Canada

Application March 6, 1950, Serial No. 147,783

3 Claims. (Cl. 64—1)

This invention relates to an improved rear axle for vehicles, such as trucks, automobiles, and the like.

In most vehicles such as trucks, buses, and automobiles, there is a differential in the rear thereof and an axle extends outwardly from each side of the differential and has a wheel mounted on its outer end. The drive from the engine of the vehicle is transferred through these shafts to the wheels. Each of these shafts usually is splined at its inner end, the end which fits into the differential. As these axles are subjected to very great strain, they often break, and it has been found that these breaks usually occur in the shaft at the outermost end of the splines. As a result of this the splined end usually slips through the side gear of the differential into the spider gears from whence it is hard to retrieve and it often causes considerable damage to the gear teeth.

It is the main purpose of this invention to provide a shaft including means for preventing the splined end thereof from slipping into the differential should the shaft break. Furthermore, this means permits the shaft to rotate after the break without damaging any of the surrounding equipment.

The advantages of this invention are obtained by forming a passage in the axle shaft extending longitudinally therethrough. A cable is mounted in this passage and is connected to the shaft adjacent its opposite ends. It is preferable to provide a rotatable connection between the ends of the cable at the splined end of the shaft so that the shaft may rotate without twisting the cable if the shaft breaks.

An example of this invention is illustrated in the accompanying drawings in which Figure 1 is a side elevation, partly in section, of the rear axle, Figure 2 illustrates a cable to be threaded into the shaft, Figure 3 is an elevation of the inner end of the axle, Figure 4 is an elevation of the outer end thereof, Figure 5 is a longitudinal section through the inner end of the shaft, and Figure 6 is a cross section on the line 6—6 of Figure 1.

Referring to the drawings, the axle consists of a shaft 10 having a splined section 11 at its inner end, and a hub 12 and hub plate 13 at its outer end. This is ordinary construction, and the splined end fits into a differential, while the plate 13 is connected to a hub to which a wheel of the vehicle is bolted. As this apparatus and these connections are well known in the industry, they do not need to be illustrated and described.

The shaft 10 is bored longitudinally and centrally to form a passage 16 extending longitudinally thereof and opening outwardly through its opposite ends.

A cable 17 is threaded through this passage. This cable may have a sleeve 20 crimped thereon at its outer end, see Figure 2, and another sleeve 23 crimped thereon at its inner end, to which a circular flange 24 is connected. The outer end of the cable may be connected to the outer end of the shaft in any convenient manner, such as by welding at 27. The inner end of the cable may be connected to the inner end of the shaft in any convenient manner, but it is preferably rotatably connected thereto, as illustrated. For this purpose, the inner or splined end of the shaft has a recess 30 formed therein registering with the end of the passage 16. The flange 24 of the cable rotatably fits in this recess and preferably is normally spaced from the inner wall 31 of the recess, as clearly shown in Figure 5.

When rear axles of this type break, the break usually takes place at the innermost end of the splined section 11 at the point indicated by the numeral 35. Ordinarily, the splined section slips into the housing of the differential, necessitating a lot of work and trouble to get it out. The chief difficulty, however, lies in the fact that the splined section often breaks some of the teeth of the gears in the differential, or breaks other parts, making it necessary to replace the gears or parts.

All this is eliminated by the present invention. When the shaft breaks, the cable 17 prevents the splined section from slipping into the differential housing. Furthermore, by having a rotatable connection between the inner end of the cable and the axle shaft, the splined section 11 and the main portion of the shaft may rotate relative to each other without unduly twisting the cable. This means that the break does not result in any damage to the differential, and that it is very easy to get the splined section out in order that a new axle may be inserted. By spacing the flange 24 away from the inner wall of the recess 30, the shaft may expand longitudinally when the break is uneven, as indicated by the line 35 in Figure 1, to allow the parts to rotate relative to each other.

It is believed that a shaft drilled in this manner is as strong if not stronger than a solid shaft. The drilled shaft will allow a certain amount of torque without crystallization and this should prolong the life of the shaft.

What I claim as my invention is:

1. An improved rear axle for vehicles such as trucks, automobiles and the like, comprising a shaft splined at one end for connection to the differential of a vehicle, said shaft having a central passage extending therethrough from end to end thereof, a cable extending the length of the passage, a recess in the splined end of the shaft registering with the passage end, a flange on the end of the cable rotatably fitting in said recess, and means at the opposite end of the cable connecting said cable to the adjacent shaft end.

2. An improved rear axle for vehicles such as trucks, automobiles and the like, comprising a shaft splined at one end for connection to the differential of a vehicle, said shaft having a central passage extending therethrough from end to end thereof, a cable extending the length of the passage, a recess in the splined end of the shaft registering with the passage end, a flange on the end of the cable rotatably fitting in said recess normally spaced from the inner wall of the latter, and means at the opposite end of the cable connecting said cable to the adjacent shaft end.

3. An improved rear axle for vehicles such as trucks, automobiles and the like, comprising a shaft splined at one end for connection to the differential of a vehicle, said shaft having a central passage extending therethrough from end to end thereof, a cable extending the length of the passage, a recess in one end of the shaft registering with the passage end, a flange on the end of the cable rotatably fitting in said recess, and means at the opposite end of the cable connecting said cable to the adjacent shaft end.

WILLIAM CHARLES MENNEAR.

References Cited in the file of this patent

UNITED STATES PATENTS

| Number | Name | Date |
| --- | --- | --- |
| 1,897,542 | West | Feb. 14, 1933 |
| 2,473,417 | Essl | June 14, 1949 |
| 2,507,999 | Schjolin | May 16, 1950 |